United States Patent
Cath et al.

(10) Patent No.: US 9,594,468 B2
(45) Date of Patent: Mar. 14, 2017

(54) SYSTEMS AND METHODS FOR CREATING ELECTRONIC CONTENT USING CREATION APPLICATIONS OF LIMITED CAPABILITIES

(75) Inventors: Adam Cath, Oakland, CA (US); R. Douglas Winnie, San Francisco, CA (US); Bruce Frazer, San Francisco, CA (US); Matthew Cannizzaro, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1315 days.

(21) Appl. No.: 12/889,920

(22) Filed: Sep. 24, 2010

(65) Prior Publication Data

US 2014/0195938 A1    Jul. 10, 2014

(51) Int. Cl.
*G06F 3/048* (2013.01)

(52) U.S. Cl.
CPC .................................... *G06F 3/048* (2013.01)

(58) Field of Classification Search
CPC ...................................................... G06F 3/048
USPC ......................................................... 715/763
See application file for complete search history.

(56) References Cited

U.S. PATENT DOCUMENTS

| | | | |
|---|---|---|---|
| 7,426,694 B2 * | 9/2008 | Gross et al. ................... | 715/762 |
| 7,441,200 B2 * | 10/2008 | Savage ......................... | 715/762 |
| 7,594,181 B2 * | 9/2009 | Rothwein et al. ............. | 715/763 |
| 7,669,137 B2 * | 2/2010 | Chafe et al. ................... | 715/763 |
| 7,746,410 B2 * | 6/2010 | Kim ............................... | 348/569 |
| 7,757,207 B2 * | 7/2010 | Yan et al. ....................... | 717/109 |
| 7,814,430 B2 * | 10/2010 | McComber .................... | 715/771 |
| 7,840,904 B2 * | 11/2010 | Shah et al. ..................... | 715/763 |
| 7,895,566 B2 * | 2/2011 | Shenfield et al. ............. | 717/107 |
| 7,900,155 B2 * | 3/2011 | Sauermann .................... | 715/767 |
| 7,911,626 B2 * | 3/2011 | Ferlitsch ........................ | 358/1.13 |
| 2004/0001092 A1 * | 1/2004 | Rothwein et al. ............. | 345/763 |
| 2006/0041858 A1 * | 2/2006 | Yan et al. ....................... | 717/105 |
| 2006/0206890 A1 * | 9/2006 | Shenfield et al. ............. | 717/174 |
| 2008/0034300 A1 * | 2/2008 | Shah et al. ..................... | 715/763 |
| 2009/0006454 A1 * | 1/2009 | Zarzar et al. .................. | 707/102 |
| 2009/0083697 A1 * | 3/2009 | Zhang et al. .................. | 717/105 |
| 2011/0061007 A1 * | 3/2011 | Shah et al. ..................... | 715/763 |

* cited by examiner

*Primary Examiner* — William Titcomb

(74) *Attorney, Agent, or Firm* — Kilpatrick Townsend & Stockton LLP

(57) ABSTRACT

One exemplary embodiment involves receiving electronic content to be displayed and edited in an application that has limited capabilities for editing an item of the electronic content. The application opens the electronic content for editing and displays a notification indicating that editing of the item is restricted in the application. Such an application can also be configured to address one or more of various additional circumstances. For example, the application may identify representations to be displayed for items that cannot be directly displayed. As another example, the application may provide an edit approver that determines whether edits that have effects on the item are allowed.

24 Claims, 9 Drawing Sheets

SYSTEMS AND METHODS FOR CREATING ELECTRONIC CONTENT USING CREATION APPLICATIONS OF LIMITED CAPABILITIES

FIELD

This disclosure relates generally to computer software that runs, displays, provides, shares, or otherwise uses electronic content.

BACKGROUND

Various computer applications are used to create graphics, applications, animations, videos, and other electronic content. Many such applications provide a what-you-see-is-what-you-get (WYSIWYG) interface that allows the appearance of the electronic content being created to be specified on a graphical canvas area. For example, such an interface may allow the size, shape, and other display attributes of a button to be changed by a content creator manipulating a graphical representation of the button. Many aspects of electronic content cannot be fully specified through interactions with a WYSIWYG canvas. Property-selection panels are used to supplement the canvas interfaces of such editors. For example, a color selection panel may pop-up to allow a creator to specify the background color of a displayed button. Other aspects of electronic content must be specified in manually-entered software code. For example, the function and/or text of a button may be specified in software code.

The creation of electronic content can involve persons with different skills and experiences. Many of those involved in the creation of electronic content cannot or will not write or read software code, or otherwise dislike having to work with software code. Such persons are collectively referred to herein as "designers," while persons who interpret, read, write, create, and/or edit code are collectively referred to as "developers."

Designers commonly use WYSIWYG interfaces to design the appearance of electronic content. Some WYSIWYG interfaces facilitate the creation of graphical and some interactive aspects of electronic content without requiring knowledge or use of software code. However, the use of some electronic content features, functions, and customizations requires that developers add software code. To create such electronic content, designers often collaborate with one or more other people who add the software coding to the electronic content. Different electronic content creation applications can be designed to edit the same piece of electronic content yet target the different types of content creators, i.e., designers and developers. An electronic content creation application that targets designers can provide a limited interface so that the designers are not encumbered with features that will not be used.

The use of separate electronic content applications that provide different interfaces can provide various benefits. However, they also provide a potential for incompatibility. An electronic content creation application that targets designers may, for example, understand only a subset of the possible elements that might be used in the electronic content. As a specific example, a creation application that targets designers may not provide functionality to display cascading-style-sheet (CSS) features, even though such features can be added to the electronic content being created by the developer. Such lack of capability may provide an advantage since CSS relates to program-like logical rules that are applied to define the appearance of objects. Avoiding CSS, and other software code-specific features, can simplify the creation application's interface and make it easier for designers to use. Moreover, it can be advantageous to limit or avoid interpreting developer-entered, arbitrary code with respect to a WYSIWYG interface. Programming languages designed for developer-coding are generally very complex and have many constructs that have no visual representation.

Because a creation application that targets designers may have limited capabilities, incompatibility issues may arise if it opens electronic content that contains features added by another, more capable creation application. Compatibility issues can occur if manual code is inserted in a collaborative project by a developer, for example, to add business logic, data connectivity, etc. Opening a project, a designer might find that it does not compile, does not quite work, or cannot be edited. Because of such incompatibilities, a common workflow involves a designer creating the visuals for a project, handing those visuals off to development, and then not expecting to change anything except by sending mockups or textual requests to the developer, who then integrates the changes. This can be inefficient and often sacrifices the integrity of the designer's vision and intentions.

SUMMARY

One exemplary embodiment involves receiving electronic content to be displayed and edited in an application that has limited capabilities for editing an item of the electronic content. The application opens the electronic content for editing and displays a notification indicating that editing of the item is restricted in the application. Such an application can also be configured to address one or more of various additional circumstances. For example, the application may identify representations to be displayed for items that cannot be directly displayed by the application. As another example, the application may provide an edit approver that determines whether edits that have effects on the item are allowed.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Figure 1:
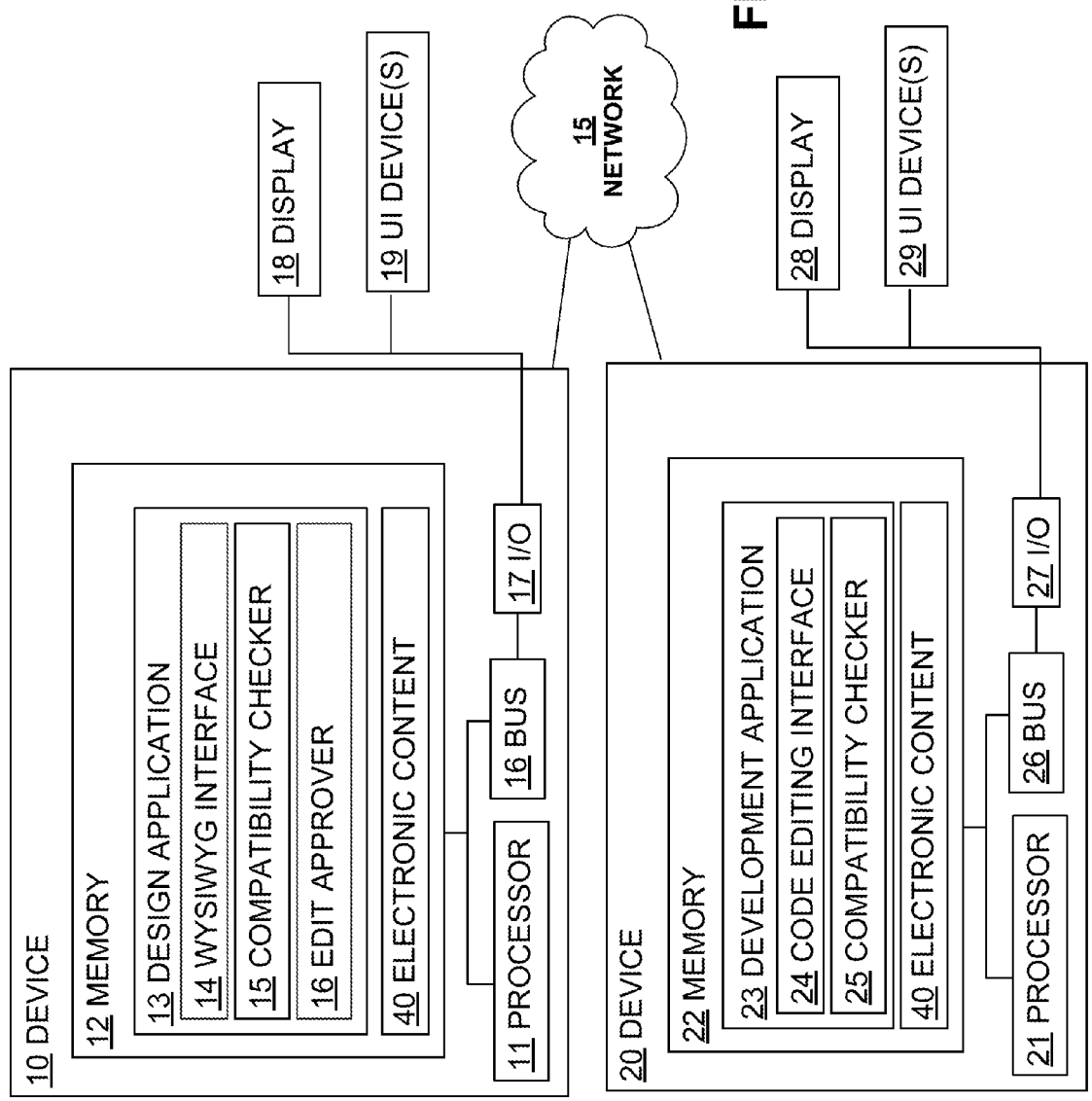
FIG. 1 depicts an exemplary computing environment in which an electronic content is available and indexed for search engine searching.

Methods and systems are disclosed that facilitate electronic content creation using creation applications of differing capabilities. An exemplary system involves at least a first electronic content creation application that provides a WYSIWYG interface and a second electronic content application providing at least one creation feature different from those provided by the first application. For ease of understanding such a first application is referred to as a "design" application and such a second application is referred to as a "development" application. A design application has limited editing capabilities with respect to items that cannot be fully edited by the design application. In contrast, a development application may provide for creating and editing electronic content features that cannot be fully displayed and/or edited by the design application. In many scenarios, but not always, a development application will provide code creating/editing features not provided by a design application. A development application may provide for the creation and editing of software code added by a developer, which is referred to herein as "arbitrary" code in contrast to code provided by a creation application itself, for example, to define standard electronic content components, e.g., standard buttons, lists, text boxes, etc.

A design application and a development application can be used in collaborative content creation projects, including projects in which a design application is used to edit electronic content after such content is edited by a development application. In many scenarios, design and development can even proceed in parallel on a single electronic content creation project. Various techniques are used to address potential incompatibility issues arising from developer-application-created electronic content features not being fully displayable or editable in a design application.

A design application can be configured to identify electronic content containing features that the design application does not provide full editing capabilities. The design application includes a compatibility checker that evaluates such features and determines whether to prohibit opening of the electronic content entirely or whether to open the electronic content. If such content is opened, the interface of the design application may provide various graphical representations, notifications, and/or limit editing capabilities so that the inclusion of the elements that are not fully editable does not confuse the designer or otherwise allow editing that is undesirable, e.g., that breaks a developer-created element.

The design application can be configured to display representations for electronic content elements are not fully displayable and/or editable. For example, if a developer has provided a custom checkbox component, the design application may provide a square or other graphic to represent that component even though it cannot fully display or allow editing of the component. The design application may be able to infer size, shape, or other characteristics of the component and use those inferences to provide a graphical approximation for the component. The design applications may further provide notifications regarding such elements, for example, identifying that the checkbox component is developer-created and/or cannot be edited.

A design application can alternatively or additionally include an edit approver that evaluates and at least sometimes prevents the editing of certain elements, provides notifications, and otherwise ensures that the design application provides a reliable experience even if the electronic content includes, for example, arbitrary code that is not editable by the design application. For example, a designer may attempt to edit a developer-added custom checkbox component. An edit approver can determine whether the potential edit is allowed or prohibited. As specific examples, it may allow resizing of the checkbox, but prohibit deletion of the checkbox. A design application may thus ensure that it will not improperly edit or delete developer-created elements that the design application is not configured to edit.

Generally, a design application can be configured to allow at least some editing of partially-compatible electronic content. In some scenarios, a designer may even edit certain attributes of developer-created components that are not fully editable in the design application. Providing for the limited editing of electronic content allows designers to make design changes directly rather than having to send mock-ups or other instructions for a developer to use in editing the electronic content in a development application. This direct designer editing can save time for both designers and developers and result in better electronic content.

Compatibility can also be checked within a development application. For example, a development application may include a compatibility checker that checks whether elements that are being added by a developer will be acceptable for use in one or more design applications. For example, if a developer creates a checkbox by providing arbitrary code, the development application's compatibility checker may provide a notification that the component will prevent the electronic content from being edited in a design application or that the component will not be editable in the design application. The design application and development application may thus both include compatibility checking components. In some scenarios, the design application and development application use the same compatibility component. This helps ensure consistency and may reduce the effort required to build and use multiple compatibility checkers.

FIG. 1 depicts an exemplary computing environment in which electronic content is created using both a design application 13 and a development application 23. The methods and systems disclosed herein are also applicable on other computing systems and environments. The environment shown in FIG. 1 comprises a wired or wireless network 15 connecting devices 10, 20. In one embodiment, the network 15 comprises the Internet. In other embodiments, other networks, intranets, or combinations of networks may be used. Other embodiments do not involve a network and may, for example, provide features on a single device or on devices that are directly connected to one another. In one embodiment, a design application and a development application are implemented as different modes of a single content creation application. Other alternative networks, computers, and electronic device configurations are also possible.

As used herein, the term "device" refers to any computing or other electronic equipment that executes instructions and includes any type of processor-based equipment that operates an operating system or otherwise executes instructions. A device will typically include a processor that executes program instructions and may include external or internal components such as a mouse, a CD-ROM, DVD, a keyboard, a display, or other input or output equipment. Examples of devices are personal computers, digital assistants, personal digital assistants, cellular phones, mobile phones, smart phones, pagers, digital tablets, laptop computers, Internet appliances, other processor-based devices, and television viewing devices. The exemplary devices 10, 20 are respectively used as special purpose computing devices to provide specific functionality offered by their respective applications and by the interaction between their applications. As examples, device 10 is shown with a display 18 and various user interface devices 19 and device 20 are shown with a display 28 and various user interface devices 29. A bus, such as bus 16 or bus 26 will typically be included in a device.

As used herein, the phrase "electronic content" refers to any text, graphics, video, audio, application, executable code, or other material that can be stored on and/or presented on or through a computer or other device. A piece of electronic content can be provided as one or more electronic files and developed as part of a single content creation project. An electronic content creation application may open such electronic content for editing, for example, such that edits made using the electronic content creation application result in changes to the one or more electronic files that define or otherwise make up the piece of electronic content being created.

As used herein, the term "item" refers to any object, component, code, reference, construct, representation, graphic, file, element, or anything else that is or can be a part of electronic content. An item may comprise features and attributes that define, specify, influence, or affect how the item appears, behaviors, or is otherwise used in electronic content. An item may have features and attributes that include one or more other items within the item or that otherwise associate the item with one or more other items.

As used herein the phrase "arbitrary code" refers to any code that is added by a developer to create a new item, attribute, interactivity, or other aspect of electronic content. Electronic content may be created using a framework of standard items, attribute, interactivity, or other aspect, e.g., standard buttons, standard lists boxes, text boxes, standard colors, etc., that can be included in the electronic content by the content creators. For example, a designer may add a standard button to electronic content being developed and adjust its display attributes in the editing interface. Such standard elements are generally defined by standard framework code that is not arbitrary code. A design application may provide editing capabilities for some framework constructs, but may not provide editing for all constructs. For example, it may not provide for editing of behavior-oriented constructs, complex imperative code, or custom code constructs. The Adobe® Flex® SDK provides an exemplary framework, that provides illustrative standard, framework elements. The Adobe® Flash® Catalyst™ application is an example of a design application that allows editing of many, but not all, items that are based on Adobe® Flex® SDK elements. The Adobe® Flash® Builder™ application is an example of a development application that provides for editing of arbitrary code that uses Adobe® Flex® SDK elements, though it may only provide visual editing features for some elements.

As used herein, the term "application" refers to any program instructions or other functional components that execute on a device. An application may reside in the memory of a device that executes the application. As is known to one of skill in the art, such applications may be resident in any suitable computer-readable medium and execute on any suitable processor. For example, as shown the devices 10, 20 each comprise a computer-readable medium such as memory 12, 22 coupled to a processor 11, 21 that executes computer-executable program instructions and/or accesses stored information. Such processors 11, 21 may comprise a microprocessor, an ASIC, a state machine, or other processor, and can be any of a number of computer processors. Such processors comprise, or may be in communication with a computer-readable medium which stores instructions that, when executed by the processor, cause the processor to perform the steps described herein.

An application is referred to herein as having "limited editing capabilities" where the item comprises an feature or attribute that the application is not capable of editing. For example, as described above, a design application may not provide for editing of one or more of behavior-oriented constructs, complex imperative code, or custom code constructs. As another example, an application may not provide features for editing an items whose features or attributes where added to or modified by another application and may thus have limited editing capabilities.

A computer-readable medium may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, flash memory, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

Design application 13 is provided on device 10 to provide features for the creation and editing of a copy the electronic content 40 stored on device 10. Similarly, development application 23 is provided on device 20 to provide features for the creation and editing of another copy the electronic content 40 stored on device 20. The different copies of the electronic content 40 can be passed back and forth between the devices 10, 20 for editing by both the design application 13 and the development application 23 in a collaborative electronic content creation project. The design application 13 and development application 23 have different capabilities and may each include various features to address potential incompatibilities resulting from any such differences in capabilities.

In FIG. 1, the design application 13 provides a WYSIWYG interface 14, a compatibility checker 15, and an edit approver 16. These features are shown for exemplary purposes and these and other features of an application can be provided as modules of such an application. A design application 13 need not include all or any of these features and may include additional or alternative features useful in the editing of the electronic content 40. The compatibility checker 15 prevents and/or restricts the use of electronic content 40 if such content is incompatible or partially incompatible with the features provided by the design application 13. For example, the compatibility checker 15 may only allow the design application 13 to open the electronic content 40 for editing if the electronic content 40 conforms to a set of rules or requirements. The compatibility checker 15 may mark the electronic content 40 as incompatible if, for example, it uses any coding constructs that the design application 13 does not support. Compatibility rules can be configured to ensure that the design application 13 provides a reliable, intuitive, and WYSIWYG editing experience for any electronic content 40 that is compatible. In one embodiment, the compatibility checker 15 comprises an engine that has one or modules for checking different aspects of a piece of electronic content. For example, a first module may be used to analyze one or more files and the associated file structures and another module may be used to check more specific data structures derived from such files, such as a parse tree of the file. Such modules may be parameterized such that when instantiated or otherwise used, the modules perform compatibility checking according to their parameters. Such parameters may be used to define compatibility criteria. Thus, in checking the compatibility of code, assets, files, or other items of electronic content, a module of the engine may perform such checking according to parameters provided from, for example, a separate schema or grammar file. Using such separation may provide various benefits, for example, allowing a given engine to be used with different schemas. A schema or grammar file can be configured to facilitate compatibility checking. In one embodiment, a grammar file comprises declarative statements that parameterize modules of the engine to facilitate compatibility checking. In one embodiment a grammar file comprises recursively defined rules (i.e., rules defined in terms of each other) that define how content should be checked for compatibility. Rules of such a grammar file can thus be configured like the rules in the grammar used by a conventional recursive decent parser, except that rather than defining rules for processing text, the grammar file can define rules for processing disparate high-level data structures, for example a file system tree, parse tree, asset decoder, or other data structures used to process electronic content.

Compatibility checker 15 can be configured to prevent the opening of some of the electronic content 40 in certain circumstances because of incompatibilities but is also configured to allow the opening of electronic content 40 in other circumstances even though the electronic content 40 contains one or more incompatible elements. Thus, in certain circumstances, the design application 13 can be used to edit the electronic content 40 even though it is only partially compatible. The design application 13 may display and allow editing of such partially-compatible electronic content 40, but may impose certain restrictions, provide certain notifications, and/or otherwise control the use of the electronic content 40. The compatibility checker 15 can ensure that display and/or use of incompatible elements facilitates rather then hinders the creation process. The compatibility checker 15 may be able to obtain or infer enough information about the incompatible parts that it can isolate them, indicate that they are incompatible parts, and allow the user to work around them. For example, the compatibility checker 15 can allow the WYSIWYG interface 14 to display approximations of incompatible elements so that a designer can visualize generally how the inclusion of such elements affects the appearance of the electronic content 40. Certain elements may be displayed with notification or other indicia indicating that such elements are developer-created and/or that such elements cannot be edited in the design application 13.

Figure 2:
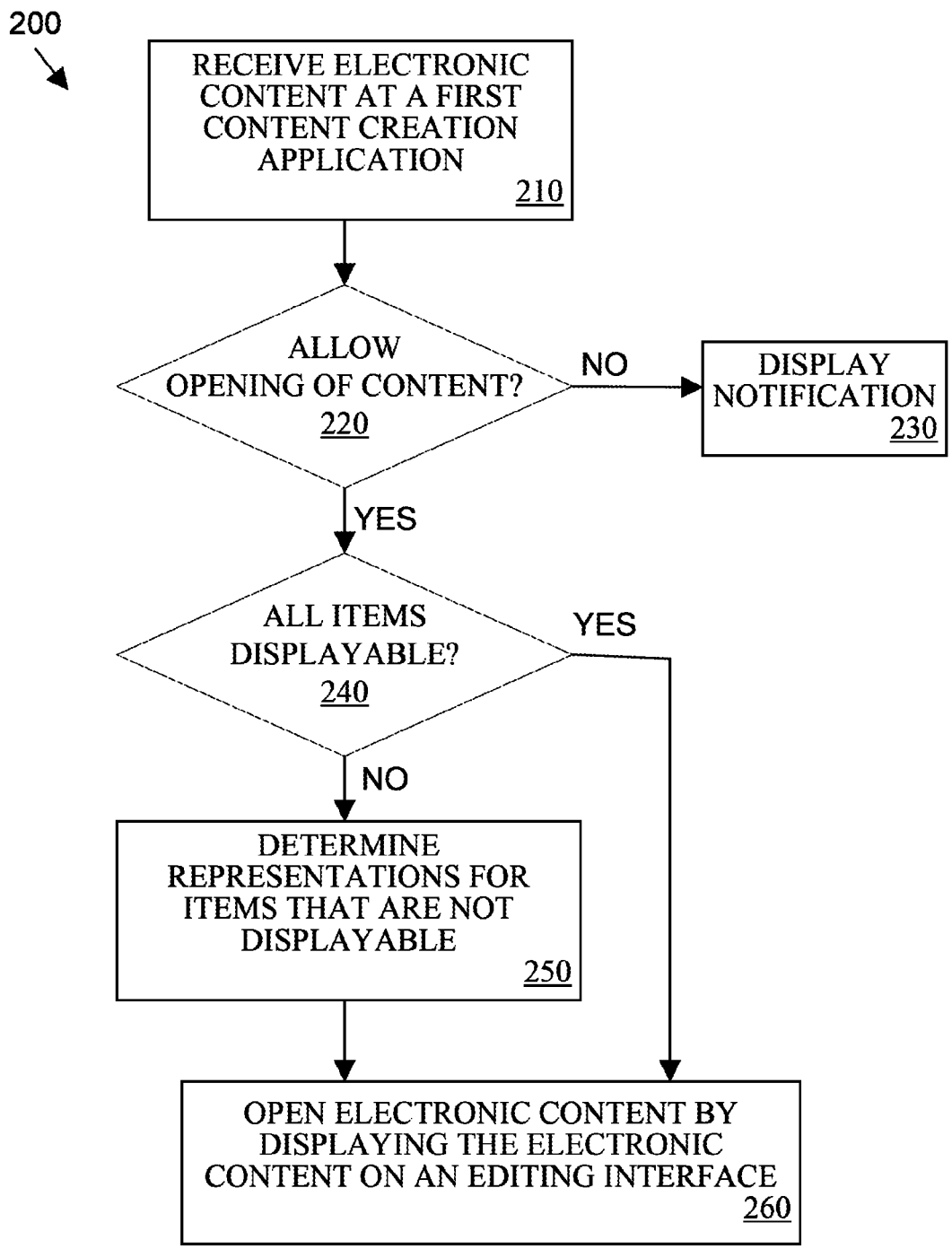
FIG. 2 is a flow chart for an illustrative method of checking compatibility while opening electronic content that may have incompatible items.

FIG. 2 provides an illustrative method 200 of checking compatibility while opening electronic content 40 that may have incompatible items. The method 200 could be performed by the compatibility checker 15 of the design application 13 of FIG. 1. Accordingly, the exemplary method 200 is described with reference to portions of FIG. 1. However, this method 200 may be performed by alternative components in alternative computing environments. Moreover, variations of this method 200 that include fewer, more, or alternative steps may be used to address potential incompatibilities in electronic content.

As shown in block 210 of FIG. 2, the exemplary method 200 involves receiving electronic content 40 at a first content creation application such as design application 13 of FIG. 1. The electronic content 40 may be retrieved over a network 15. The electronic content 40 may be retrieved in response to input selecting the electronic content 40 for download. Alternatively, the electronic content 40 may be retrieved after being exported by another content creation application, such as development application 23. As yet another alternative, the electronic content 40 may simply be received from memory 12 on device 10.

The method 200 next determines whether to allow the opening of the electronic content 40, as shown in block 220. Such a determination can involve various considerations. In one exemplary embodiment, the electronic content 40 is examined to identify any items that would cause the design application 13 to crash or otherwise malfunction. If the opening of the electronic content 40 is not allowed, the method 20 proceeds to block 230 and displays a notification. For example, design application 13 may display a notification that reads "THIS PROJECT CANNOT BE OPENED BECAUSE IT CONTAINS INCOMPATABLE ITEMS."

If, however, opening of the electronic content 40 is allowed, the method 200 proceeds to block 240 to determine whether all of the items of the electronic content 40 are displayable in the first content creation application. For example, in one exemplary scenario, all items are displayable if the electronic content 40 does not include any arbitrary code or other developer-added features. If all items are displayable, the method 200 proceeds to block 260 to open the electronic content 40 and display the electronic content 40 on an editing interface. The WYSIWYG interface 14 of FIG. 1 is an example of such an editing interface. Non-WYSIWYG interfaces may alternatively or additionally be used to display the electronic content 40 for editing.

If all items are not displayable in the first content creation application, the method 200 proceeds to block 250 to determine representations for items that are not displayable. For example, design application 13 may recognize that a developer-added item has certain recognizable characteristics such as position and shape. Even though the developer-added item may also have functional characteristics, such as code-defined interactivity of the item, that cannot be displayed and/or edited by the design application 13, the design application may use the recognizable information that it can obtain or infer about the item to determine one or more graphical representations that can be used to represent the item in the editing interface. Those representations can be used in block 260 to display the electronic content 40 on an editing interface that includes WYSIWYG interface 13 of FIG. 1. Block 250 may not be able to determine graphical representations for some or all of the items that are not displayable. Such items can be omitted from the display of the electronic content 40.

Figure 3:
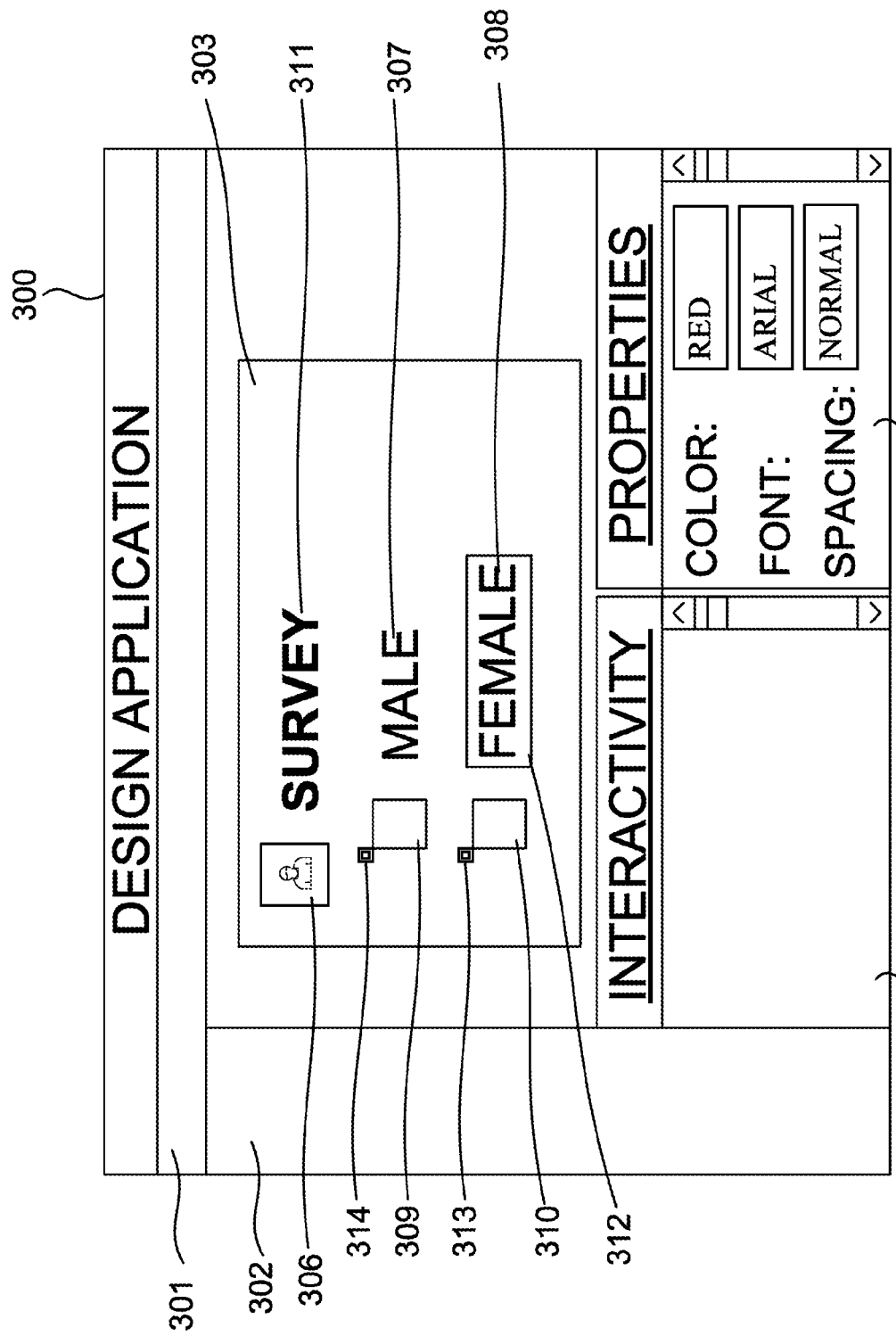
FIG. 3 illustrates an exemplary design application interface displaying electronic content by displaying representation of items that are not displayable.

FIG. 3 illustrates an exemplary design application 13 interface 300 displaying electronic content 40 by displaying representation 309, 310 of items that are not displayable. The exemplary interface 300 is described with reference to portions of FIG. 1. However, such an interface could be performed by alternative components in alternative computing environments. The exemplary interface 300 includes a tool bar 301 that may be used to present menus offering various editing and other design application features. It also includes a file list 302 that may be used to list and allow access to one or more files that provide the electronic content 40 that is being editing by the design application 13. The exemplary interface 300 further includes a canvas area 303 that presents a WYSIWIG interface, such as WYSIWIG interface 14, for allowing graphical editing of items of the electronic content 40. The exemplary interface 300 may also include panels, such as interactivity panel 305 and properties panel 304, that may be used to edit the electronic content 40. Design application 13 may include additional panels (not shown) that facilitate the editing of states, transitions, layers, and other attributes of electronic content. Such panels may provide a mechanism for editing the electronic content 40 without requiring the designer to enter or edit software code. The design application 13 will generally not provide for editing code or for performing developer tasks. Accordingly, as examples, the design application 13 may not have panels for specifying a data binding or defining CSS.

The canvas area 303 shows items of the electronic content 40. In the example of FIG. 3, the electronic content includes an image 306, a title 311 that presents the text "SURVEY," and text items 307, 308 that present the text strings "MALE," and "FEMALE," respectively. The canvas area 303 also includes representations 309, 310 of items that the design application 13 is not otherwise able to display. In this example, each of the representations 309, 310 represents an instance of a developer-coded, custom checkbox component. A developer may have used development application 23 to create such a component and then include the two instances of the checkbox component in the electronic content 40.

The arbitrary code defining the characteristics of the custom checkbox component and its two instances may be included in the electronic content 40 that is received and opened by the design application 13. The design application 13, for example, through a compatibility checker 14, may determine that the electronic content 40 is allowed to be opened even though there is arbitrary code in the electronic content 40. The design application 13 may then identify representations to use for the items that cannot otherwise be displayed and determine positions for those representations. In the example of FIG. 3, the design application 13 determines to use square-shaped representation to represent the checkbox instances and positions those representations 309, 310 as shown in FIG. 3. The size, shape, and other display characteristics of the representation can be obtained or inferred by examining the items. For example, such items may have declarative statements that define the size, shape, and position of the component and script-based procedural code that defines the interactivity of the items. In such a case, the design application may parse the declarative statements and recognize the size, shape, and position information, which can then be used in displaying the representations. Accordingly, a design application is able to display a representation for an item even though would not otherwise be able to display the item.

The representations 309, 310 are displayed along with indicators 313, 314 that indicate that those representations are different from other items that are displayed. For example, such indications may indicate that those items came from developer-provided code and/or that such items cannot be edited. Such indications 309, 310 and other notifications and information can be included in the exemplary interface 300 to aid a developer in easily recognizing circumstances in which an item is displayed by a representation in the design application and thus recognize that interaction with and/or editing of the item may be limited.

Figure 4:
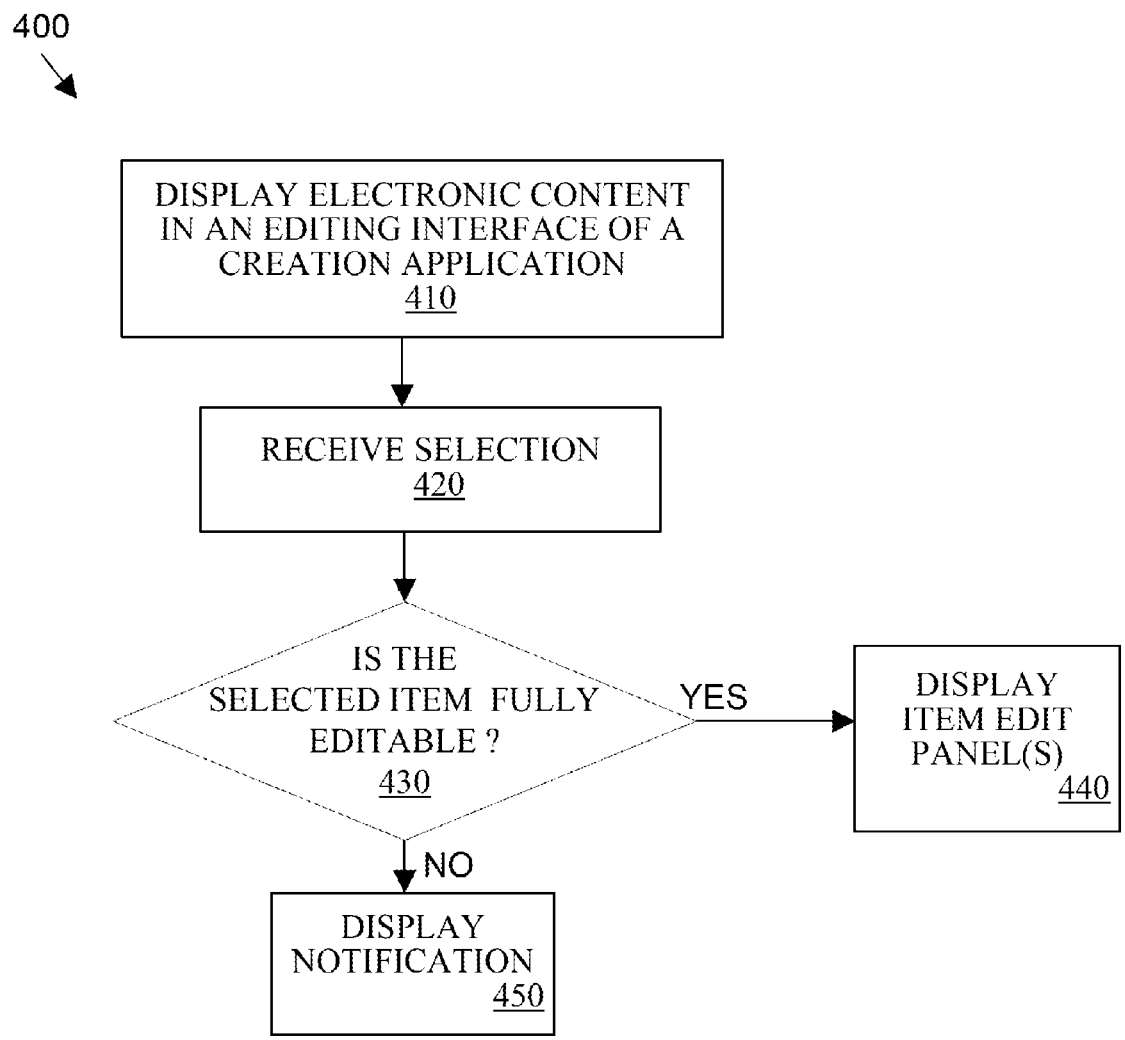
FIG. 4 is a flow chart for an exemplary method of providing a notification that a selected item in electronic content is not fully editable by the content editing application.

FIG. 4 illustrates a flow chart for an exemplary method 400 of providing a notification that a selected item in electronic content is not fully editable by the content editing application. The method 400 could be performed by the design application 13 of FIG. 1. Accordingly, the exemplary method 400 is described with reference to portions of FIG. 1. However, this method 400 may be performed by alternative components in alternative computing environments. Moreover, variations of this method 400 that include fewer, more, or alternative steps may be used to provide a notification that a selected item in electronic content is not fully editable by the content editing application.

In FIG. 4, the exemplary method 400 involves displaying electronic content 40 in an editing interface of a creation application, as shown in block 410. For example, electronic content 40 may be displayed in the WYSIWYG interface 14 of design application 13 of FIG. 1. The exemplary method next involves receiving a selection, as shown in block 420. For example, a designer may use a mouse or other UI device to position a pointer and then select an item on the WYSIWYG interface 14. The method 400 next determines whether the selected item is fully editable, as shown in block 430. For example, design application 13 may search the electronic content 40 for any code, specification, or other references to the selected item that do not satisfy certain predefined criteria. As a specific example, the design application 13 may identify a reference in a portion of arbitrary code to an item and, based on this identification, determine that the item is not fully editable. In many scenarios, a design application determines that a selected item is not fully editable when all or a portion of it is specified by developer code.

If the selected item is fully editable, the method 400 proceeds to display any item edit panels associated with the item, as shown in block 440. FIG. 3 provides an illustration of a text item 308, that has been selected as indicated by selection indicator 312. Upon such a selection, the exemplary interface 300 displays the interactivity panel 305 and the properties panel 304 to facilitate editing of that text item 308.

Figure 5:
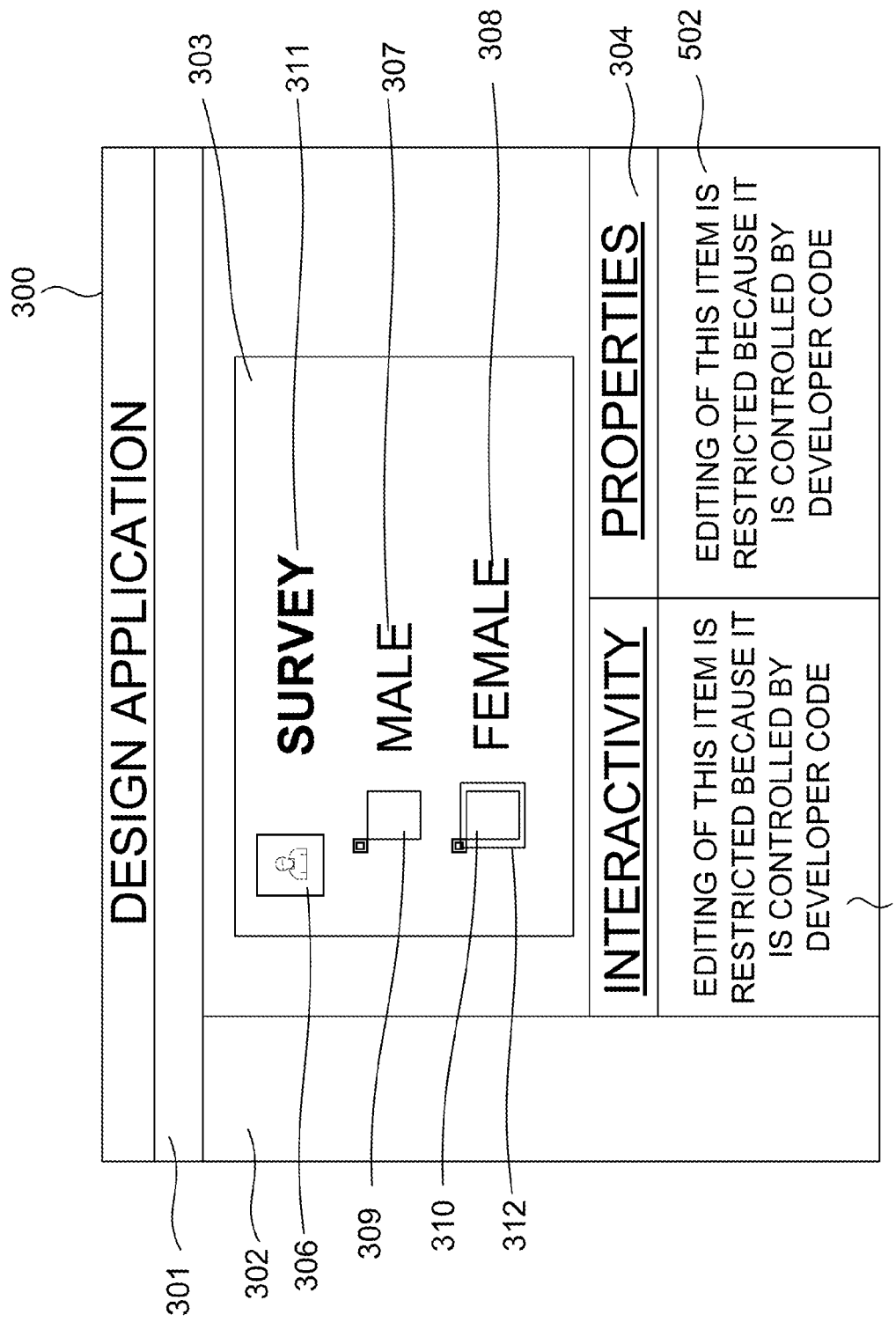
FIG. 5 illustrates the exemplary interface of FIG. 3 showing notifications that certain editing features are not provided for a selected item.

Returning to FIG. 4, if the selected item is not fully editable, the method 400 proceeds to block 450 and displays a notification. FIG. 5 illustrates the exemplary interface of FIG. 3 showing notifications 503, 504 both that certain editing features for a selected item that is not fully editable are not available. In FIG. 5, the item 310 that is not fully editable has been selected as indicated by selection indicator 312 shown in its new position in FIG. 5. Upon such a selection, the exemplary interface 300 changes to display notifications 503, 504 both indicating that "EDITING OF THIS ITEM IS RESTRICTED BECAUSE IT IS CONTROLLED BY DEVELOPER CODE." Limited editing of the item 310 may be allowed. For example, the designer may be able to reposition and resize object 310 even though the designer cannot use the interactivity panel 305 or property panel 304 to edit the interactivity or properties of the item 310, respectively.

In an alternative embodiment, the design application allows certain attributes of an item to be edited and restricts other attributes from being edited. For example, the exemplary interface 300 may allow the properties of item 310 to be edited but prohibit editing of the interactivity of the item 310.

Returning to FIG. 1, the design application 13 also includes an edit approver 16 that can restrict or prevent editing of incompatible elements in the electronic content 40. In many circumstances, the edit approver will prevent any editing of incompatible parts since such edits may have effects may not be intended. The edit approver 16 can execute upon each attempted edit made by a designer to determine whether the potential edit is allowed or prohibited. That determination can be based on one or more rules that attempt to infer whether a given edit will result in a problem. For example, deleting an item may be allowed in a circumstance in which there are no references to the item elsewhere in the electronic content 40 but prohibited in the circumstance in which a piece of developer code in the electronic content 40 contains a reference to the to-be-deleted item.

Figure 6:
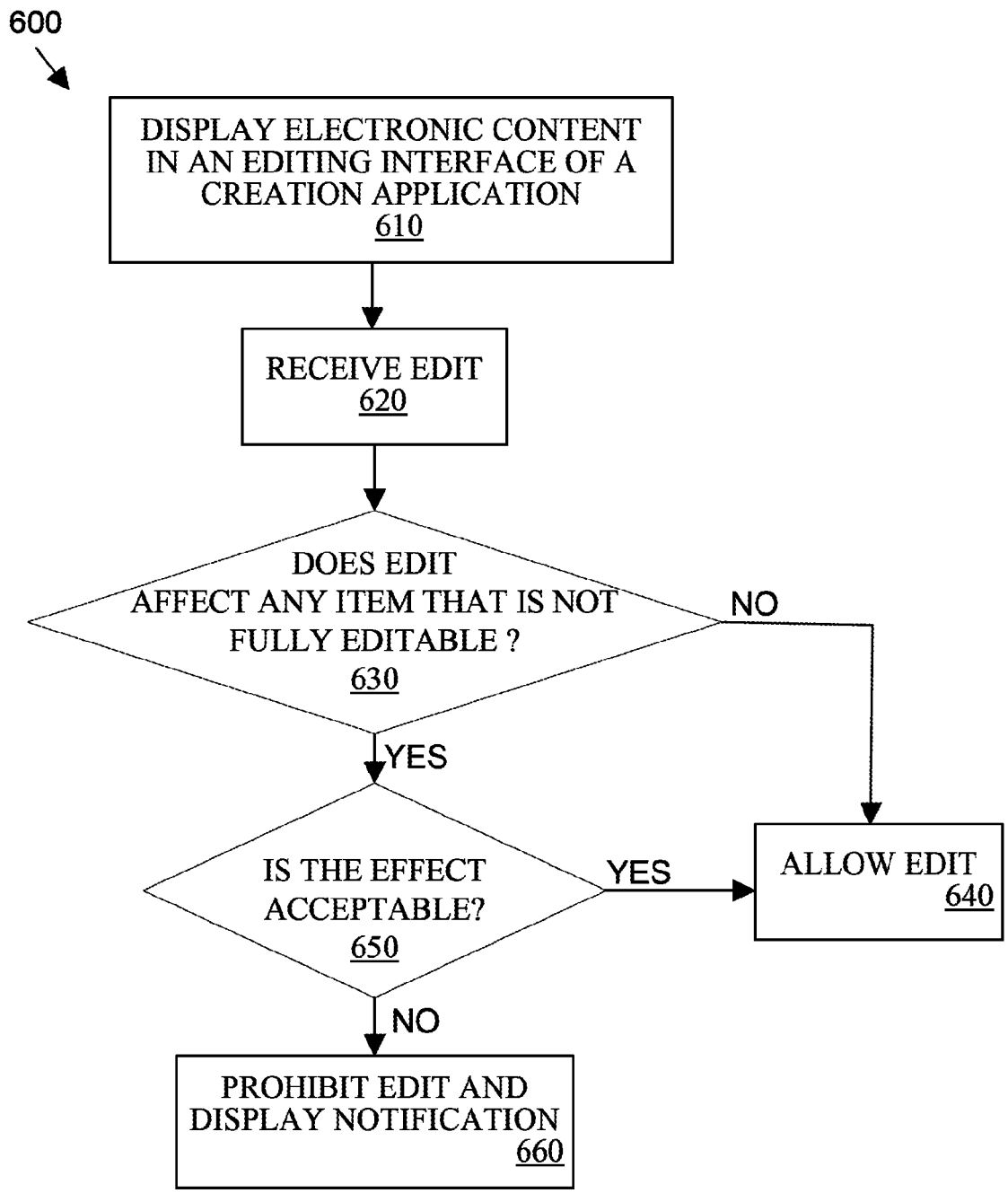
FIG. 6 is a flow chart providing an exemplary method of prohibiting editing of items for which full editing capabilities are not provided by a content creation application.

FIG. 6 is a flow chart providing an exemplary method 600 of prohibiting editing of items for which full editing capabilities are not provided by a content creation application. The method 600 could be performed by the edit approver 16 of design application 13 of FIG. 1. Accordingly, the exemplary method 600 is described with reference to portions of FIG. 1. However, this method 600 may be performed by alternative components in alternative computing environments. Moreover, variations of this method 600 that include fewer, more, or alternative steps may be used to prohibit editing of items for which full editing capabilities are not provided by a content creation application.

In FIG. 6, the exemplary method 600 involves displaying electronic content 40 in an editing interface of a creation application, as shown in block 610. For example, electronic content 40 may be displayed in the WYSIWYG interface 14 of design application 13 of FIG. 1. The exemplary method next involves receiving an edit, as shown in block 620. For example, a designer may use a mouse or other UI device to position a pointer and then select an item on the WYSIWYG interface 14 and then press the delete key in an attempt to delete the item.

The method 600 next determines whether the edit will affect any item that is not fully editable, as shown in block 630. For example, design application 13 may search the electronic content 40 for any items affected by the edit to determine if any such items are not fully editable by further searching for any code, specification, or other references to any such items that do not satisfy certain predefined criteria. If the edit does not affect any items that are not fully editable, the method 600 proceeds to allow the edit, as shown in block 640. However, for each item that is not fully editable that is affected by the edit, the method 600 proceeds to determine if the effect is acceptable. This may involve analyzing any code, specification, or other references to any such items to determine whether certain predefined criteria are satisfied. If the effect is acceptable, the method proceeds to allow the edit in block 640. If not, the method 600 proceeds to block 660 to prohibit the edit and display a notification.

Figure 7:
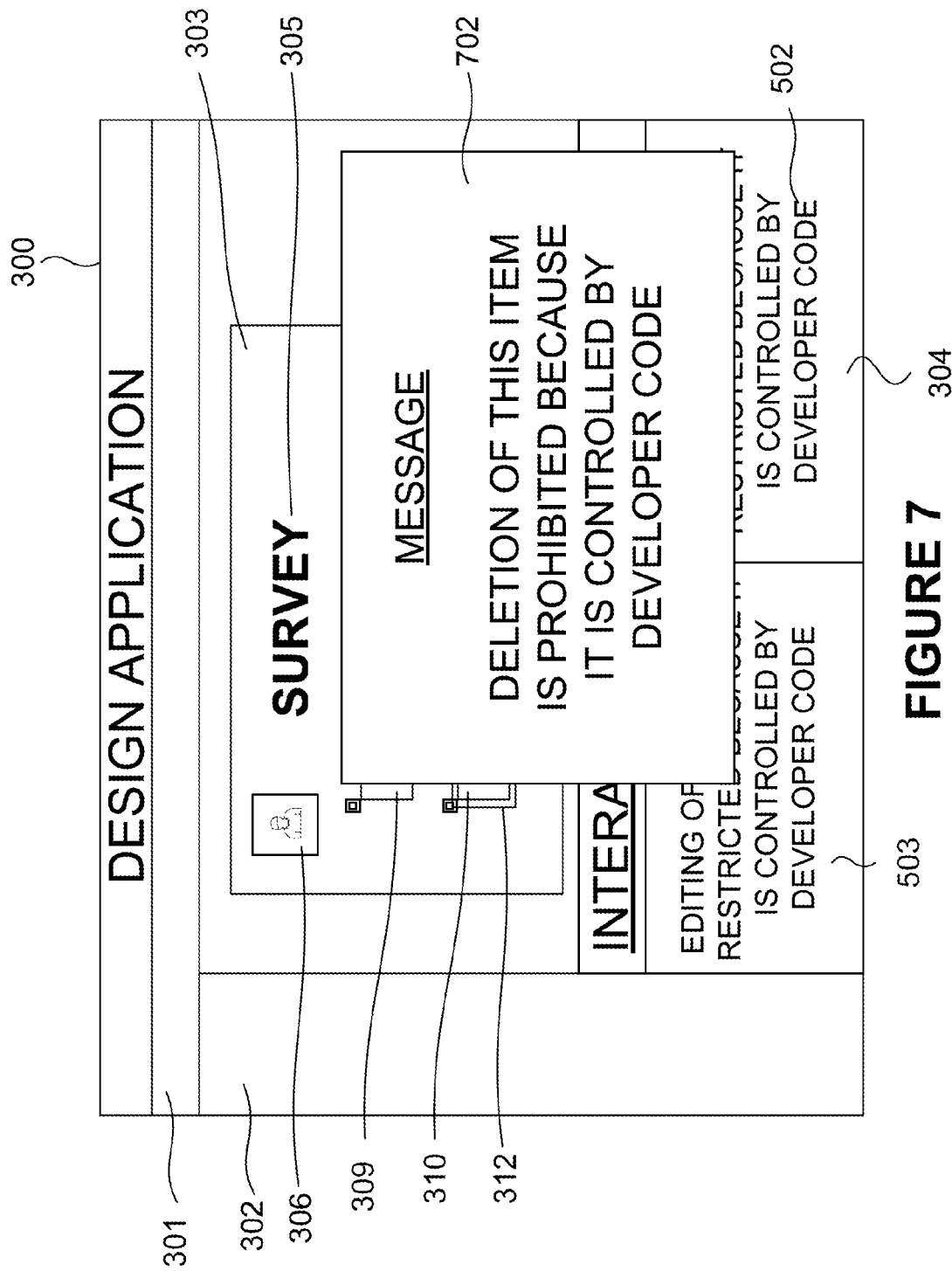
FIG. 7 illustrates the exemplary interface of FIG. 3 showing a notification that an edit is prohibited.

FIG. 7 illustrates the exemplary interface of FIG. 3 showing a notification 702 that an edit is prohibited. In this example, a designer attempted to delete item 310 in the exemplary interface 300. Upon such an attempted edit, the edit approver 16 of design application 13 determines that the edit will result in an effect that is not acceptable and presents warning message 702 indicating that "DELETION OF THIS ITEM IS PROHIBITED BECAUSE IT IS CONTROLLED BY DEVELOPER CODE." An edit approver may alternatively determine that the deletion of item 110 or another edit of any other developer-coded item is acceptable and allow the edit rather than presenting the message 702.

As a specific example, a developer may have provided the following exemplary arbitrary code related to a databinding for a checkbox item.

<Button label="{myCheckbox.selected ? 'Yes': 'No'?"}/>
<Checkbox id="myCheckbox"/>

The above expression is only valid if a checkbox exists, if the checkbox is an item that has a selected property whose type is Boolean. The design application 13 can ensure that any change to a checkbox does not invalidate that expression. If a designer attempts to delete a checkbox item, the design application may determine an identifier of the checkbox item, and search for any references to that identifier and ultimately identify the above expression. The design application 13 may determine that allowing the delete would result in this checkbox expression no longer working and, accordingly, prohibit the deletion of the checkbox item. Alternatively, the design application may simply determine that the data binding expression, which may only be associated with the to-be-deleted item, can itself also be deleted. A design application may apply rules to determine whether to allow an edit or not. For example, such rules may specify that in circumstances in which arbitrary developer code is related to an item that is to be edited, the design application 13 will prohibit the edit. As another example, the design. application 13 may apply a rule that prohibits an edit in circumstances in which arbitrary code associated with a to-be-edited item cannot be itself be deleted because, for example, it is used by other items.

Whether developer code is fully editable or not can be determined in various ways. The syntax of developer code can be used in such determinations. For example, a developer may provide code that defines that when a button is clicked several items will slide across the displayed electronic content. The developer may have done so by declaring an animation with a name, by stating "myanimation.play( )," and then providing imperative code that specifies the animation specifics. The design application 13 may not be capable of otherwise using this syntax and code, but may be able to make certain inferences from it. For example, the design application 13 may determine from the syntax that this code is invoking a method on some object. It may be able to inspect to the code to determine the type of the object on which the method is being invoked. It may further be able to determine or categorize what is being done with the object, i.e., determine that it is some sort of animation.

The design application 13 may use this information in determining whether it can display and/or allow editing of the item. In this example, the design application 13 may assume that it can manipulate this code because it knows so much about it. The design application may use the information it determines to provide information to a designer. For example, it may show a message indicating that a click on this button will play an animation that slides certain other items across the displayed electronic content. In addition, the design application 13 may use this information to determine relationships between pieces of code. For example, the design application may determine that deleting the button will have an effect on the items that are animated (i.e., the items that are going to slide across the displayed electronic content). However, the design application 13 can determine that such a deletion can be allowed on the assumption that if the designer does not want the button then the items are not longer wanted either. Thus, in response to deleting the button, the design application 13 may delete the animation as well. If, however, the developer had added code to the button code that specified accessing a data server before the animation, the design application 13 may determine that deletion of the button affects code that is not fully editable and prevent the deletion.

Certain embodiments disclosed herein are useful in addressing incompatibilities that result between content creation application used with electronic content that includes at least some content specified in an open-ended format that allows a developer to add arbitrary code that may not be editable by a particular content creation application. Such code may be declarative or imperative. For example, a developer may have written imperative code to define interactivity in electronic content 40. The design application 13 receiving such electronic content 40 may recognize that it contains code relating to interactivity and that such code is arbitrary such that it cannot be edited by the design application 13. As another example, electronic content 40 may include a file 40 that cannot be opened or accessed by the design application 13 because the file is created in a format that allows the inclusion of arbitrary code. The design application 13 can recognize the existence of such arbitrary code and prevent opening of the electronic content 40 or allow restricted editing of the electronic content 40 as may be appropriate depending on the particular nature of the arbitrary code. In many circumstances, the design application is able to analyze arbitrary code to break it down into component pieces and then apply a set of rules to determine whether certain conditions are met such that the electronic content can be displayed and, if so, which items and item characteristics of the electronic content 40 should be editable by the design application 13.

In applying such rules, the design application 13 may apply different criteria to different types of code. For example, if the electronic content includes developer code in both a declarative format and an imperative format, the design application 13 may apply more stringent compatibility criteria to the imperative-formatted code since such code may be harder to interpret. In contrast, since the declarative-format code may conform to certain simple declarative rules known to the design application 13, it may apply less stringent criteria. For example, if a piece of declarative code includes a tag that is not editable by the design application 13 but that is included as defining an attribute of a known component, the design application 13 may determine whether to allow an edit affecting that component based on the type of the attribute. For example, the design application 13 may allow the edit based on whether the arbitrarily-coded attribute is a behavioral attribute (e.g., specifying that a button can have either a normal or repeat click mode) or a non-behavioral attribute such as one defining an item's color. The design application 13 may have a listing of all of the known properties of all standard items (i.e., those that are not developer-coded, custom items) that are used in the declarative language associated with the electronic content creation framework. The listing may identify whether the attribute is behavioral, non-behavioral, or otherwise specify criteria that the design application can use to determine whether to display an item that is not fully displayable and/or editable, how to display such an item, and how such item can be edited in the design application 13.

Figure 8:
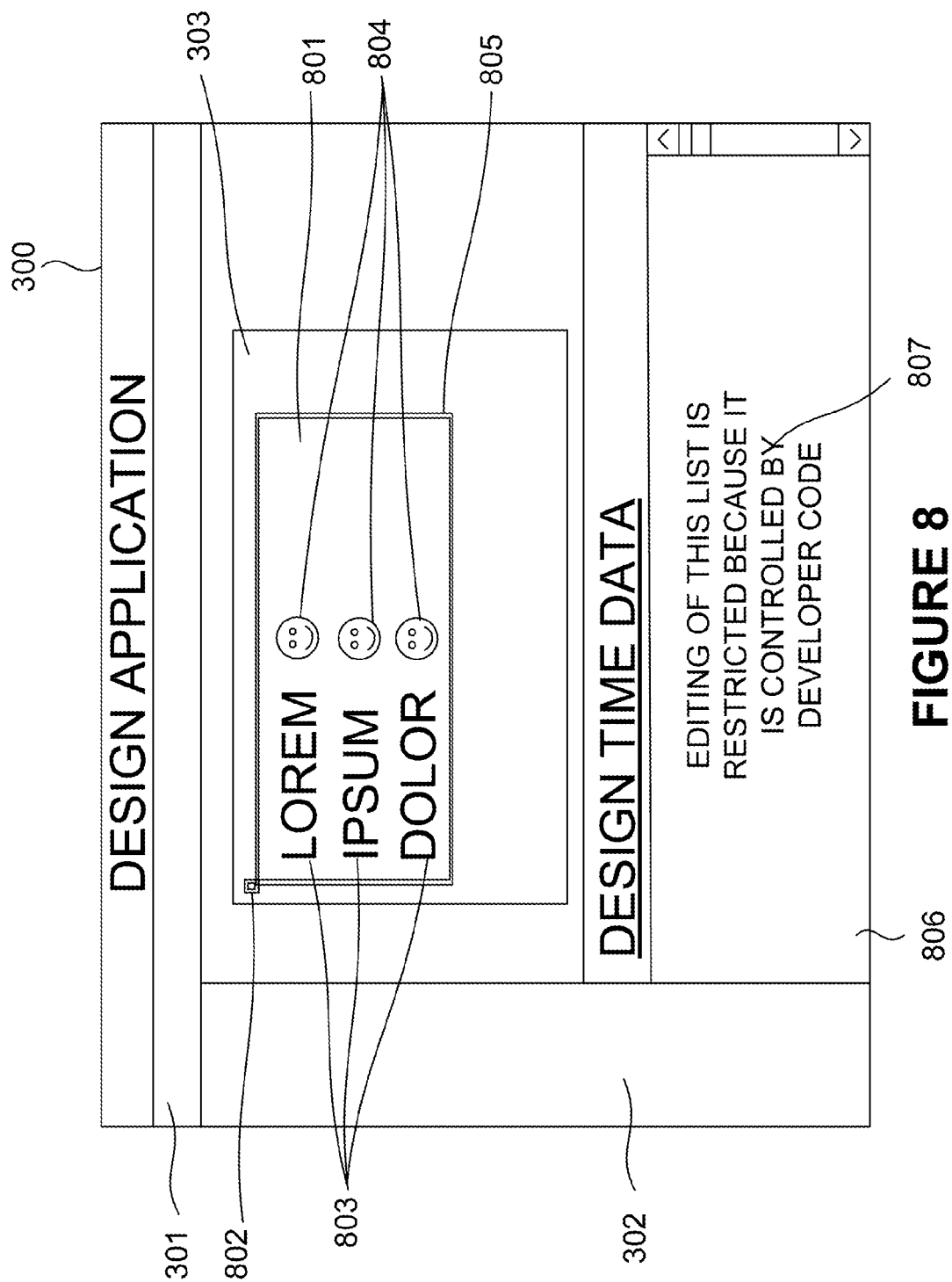
FIG. 8 illustrates the exemplary interface of FIG. 3 in which the displayed electronic content includes a listbox type item, a message that editing of data is prohibited because the listbox type item is for of a type for which full editing capabilities are not provided, and fabricated listbox data.

FIG. 8 illustrates the exemplary interface of FIG. 3 in which the displayed electronic content 40 includes a listbox type item 801, a message 807 that editing of the data is prohibited because the listbox item is not fully editable, and fabricated listbox data. The listbox type item 801 is a visual component that is provided to show multiple items within it. Ultimately, listbox data that is used to populate the listbox type item 801 may come from an external datasource that is not available to the design application 13. Where such listbox data is unavailable, it may be desirable to include fabricated or dummy data to improve the designer's ability to visualize the component. Prior to any databinding being associated with such a listbox type item 801, a designer may have used a design time data panel 806 to manually enter fabricated or dummy data for inclusion in the listbox type item 801 for design visualization purposes.

In the particular example of FIG. 8, however, a databinding has already been created for the listbox type item 801 and included in the electronic content 40. As a result, the design interface 300 displays the message 807 in the design time data panel 806 stating that "EDITING OF THIS LIST IS RESTRICTED BECAUSE IT IS CONTROLLED BY DEVELOPER CODE." Such a message 807 and the associated restriction on editing may be appropriate, for example, in the circumstance in which a developer has associated a databinding with the listbox type item 803 so that the designer is prevented from making an edit to design time data that could have a negative effect on the developer-coded databinding. The designer may, however, be permitted to reposition and resize the listbox type item 801 or change other characteristics of the listbox type item 801 in the design application 13.

FIG. 8 further illustrates the design interface 300 determining fabricated or dummy data to be displayed in the listbox item 801. In particular, the listbox item 801 includes textual data and images that are displayed based on the inferred schema of the data that will be associated with the listbox item. Such a schema may be inferred by the design application examining the databinding code provided by the developer. As a particular example, if there is one data binding present, "data.firstname," then the design application 13 may infer that there is something called "firstname" and that "firstname" will be a string. If there is an image reference such as "imagesource=data.icon," the design application 13 can infer that the schema has a bitmap field called icon. Thus, the design application 13 is able to infer that the listbox item has a field called firstname that is a string and an icon that is a bitmap. This information can then be used to mock up dummy data that conforms to that known information and insert that dummy data for purposes of display in the WYSIWYG interface 14 of the design application 13.

Alternatively, rather then generating the dummy data, the design application 13 may use the information known about the schema to provide an interface that allows the designer to select appropriate dummy data from, for example, drop down selection tools. In the above example, a string selection tool may be provided to accept one or more strings to use as dummy data, and an image selection tool may be provided to select one or more images to use as dummy data in the appropriate portions of the listbox type item displayed in design application 13, as may be appropriate based on the inferences drawn about the schema that is associated through the data binding.

Electronic content can include code that specifies use of items in the content and the appearance of such items separately. For example, declarative language may be used to identify that a button is included in the electronic content. That declarative language may include a tag that identifies that a separate "skin" file specifies the appearance of the button. That skin file, in this example, can also be declarative and may have a root tag skin and other appearance defining tags, for examples, specifying that the button includes a rectangle or particular text. Many button items can reference a single skin file to define their respective appearances. A design application can provide a mechanism for editing the "skin" file attributes. For example, if several buttons are associated with a particular skin, a designer can select an isolation or skin-editing mode to edit the skin associated with those items. In such a mode, the design application 13 may visually change the WYSIWYG interface 14 so that one of the buttons is shown as editable and the rest of the content is grayed. This appearance indicates to the designer that the design application 13 is in its skin-editing mode. The designer can then change the displayed button and the design application 13 will apply those changes to skin file that defines the appearance of multiple buttons in the electronic content 40, thereby affecting the appearance of all of those buttons.

One embodiment of a compatibility checker analyzes such a skin file to determine whether it includes any items, such as a datagrid, of which the design application 13 does not allow editing or use. If such items are found, the design application 13 may mark the file as an incompatible file and prevent opening of the file in the design application 13 and thus prevent any edits that would affect the contents of that file. The designer is then still able to open the electronic content 40 in the design application, but can not select the associated skin for editing in skin-editing mode. The design application 13 may still display an approximation of the buttons based on analysis of the skin. Upon selection or attempted entry into skin-editing mode, the design application may provide a notification that indicates that it is a developer component.

Returning again to FIG. 1, the development application 23 on device 20 includes a code editing interface 24 and a compatibility checker 25. These features are shown for exemplary purposes. A development application 23 need not include all or any of these features and may include additional or alternative features useful in the editing of the electronic content 40. The development application 23 may provide features supporting many or all of the items supported by the design application 13, for example, allowing developer editing of visual objects such as buttons, scrollbars, and checkboxes, states, transitions (animations between states), and visual object properties. The development application may provide additional features for editing data bindings, which as discussed previously are associations defined such that a value of a property tracks an expression that may change over time. An example of a databinding is a text field defined to be customer.first name, where the databinding defines that the first name changes if the customer object changes.

The compatibility checker 25 of the development application 23 can be invoked to give a developer an early indication of whether the code has been added by the developer is compatible with the design application 13. For example, the compatibility checker may provide warnings or errors when a developer attempts to compile the electronic content 40 (in circumstances in which the electronic content is of a type that is compiled), export the electronic content 40, or at any other appropriate occurrence during use of the development application 23.

Figure 9:
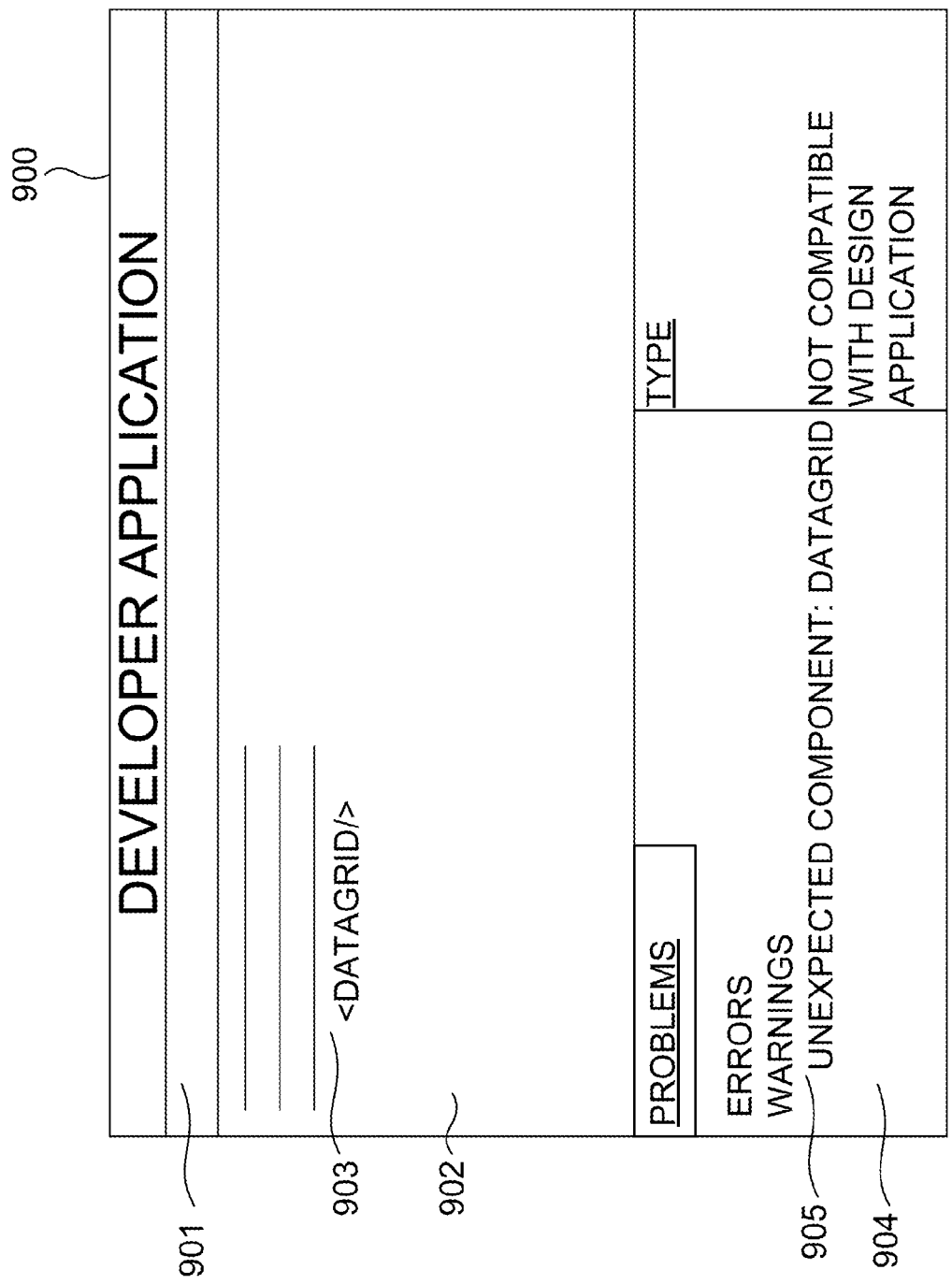
FIG. 9 illustrates an exemplary interface of a developer application that includes a notification that the electronic content being edited includes something that is not compatible with design application.

FIG. 9 illustrates an exemplary interface 900 of a developer application 23 that includes a notification 905 that the electronic content 40 being edited includes something that is not compatible with design application 13. The exemplary interface includes a code editing toolbar 901, a code editing interface 902 that includes code 903 defining some or all of the electronic content 40, and a problems area that provides notification of any problems that occur during compiling and export of the electronic content 40. In this example, a developer has attempted to compile the electronic content 40 that includes a datagrid item and the development application 23 presents a notification that states "UNEXPECTED COMPONENT: DATAGRID" and identifies that the issue type relates to compatibility, stating "NOT COMPATIBLE WITH DESIGN APPLICATION." Alternative notifications may also be utilized.

General

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A computer-implemented method comprising:
receiving, at an application executing on a device, electronic content comprising items to be displayed and edited in a What-You-See-Is-What-You-Get (WYSIWYG) interface of the application, wherein the application has limited capabilities for editing an item of the items of the electronic content, wherein the application has limited capabilities for editing the item because the item comprises a feature or attribute that the application is not capable of editing, the feature or attribute editable in a second application having different editing capabilities than the application;
opening the electronic content for editing in the application; and
indicating, in the application, that editing of the item is restricted.

2. The method of claim 1 further comprising:
determining that the application cannot display the item; and
if a representation can be used to represent the item, displaying the representation of the item in the WYSIWYG interface, wherein the application allows editing of one or more attributes of the item based on edits received to the representation, wherein the application does not allow editing of one or more other attributes of the item.

3. The method of claim 2 further comprising determining a size, shape, and position for displaying the representation of the item in the WYSIWYG interface based on corresponding attributes defined for the item in declarative statements of the electronic content that the application identifies by parsing the declarative statements.

4. The method of claim 2 further comprising fabricating data for inclusion in the representation based on the analysis of the item.

5. The method of claim 1 wherein indicating that editing of the item is restricted comprises displaying a notification when the item or a representation of the item is selected from amongst the items displayed or represented in the WYSIWYG interface of the application.

6. The method of claim 5 wherein the notification is provided in a panel otherwise used for editing item characteristics, wherein use of the panel to edit the item is not allowed.

7. The method of claim 6 wherein arbitrary code specifies interactivity of the item in the electronic content, wherein the panel is an interactivity panel.

8. The method of claim 6 wherein the panel is a timeline panel or a data panel.

9. The method of claim 1 further comprising:
receiving an edit associated with the item;
determining whether an effect of the edit is acceptable;
if the effect of the edit is acceptable, allowing the edit; and
if the effect of the edit is not acceptable, prohibiting the edit and displaying a second notification indicating that the edit has been prohibited.

10. The method of claim 9 wherein the edit is a deletion of the item, wherein the application determines that the effect is not acceptable because arbitrary code that depends on the electronic content would fail if the item were deleted.

11. The method of claim 9 wherein the application determines that the effect is acceptable because arbitrary code that depends on the item can be safely removed if the item were deleted such that the electronic content would not fail.

12. The method of claim 1 wherein the application has limited capabilities for editing the item because the item is associated with a behavioral attribute that the application is not capable of editing.

13. The method of claim 1 wherein the application has limited capabilities for editing the item because the item is associated with imperative code that the application is not capable of compiling.

14. The method of claim 1 wherein the application has limited capabilities for editing the item because the feature or attribute is defined at least in part based on arbitrary code added to the item via the second application.

15. The method of claim 1 further comprising, prior to receiving the electronic content at the application, editing the electronic content via the second application, wherein the editing comprises editing a behavior-oriented construct, complex imperative code, or a custom code construct, wherein the behavior-oriented construct, complex imperative code, or custom code construct cannot be edited by the application.

16. The method of claim 1 further comprising editing a display attribute of the item via the first application.

17. The method of claim 1 wherein the application is capable of editing standard elements defined by standard framework code but not capable of editing arbitrary code, wherein the second application is capable of editing arbitrary code.

18. A computer-implemented method comprising:
receiving, at a first application executing on a device, electronic content comprising items to be displayed and edited in a What-You-See-Is-What-You-Get (WYSIWYG) interface of the first application, wherein the first application has limited capabilities for editing an item of the items of the electronic content, wherein the first application has limited capabilities for editing the item because the item comprises a feature or attribute that the first application is not capable of editing, the feature or attribute editable in a second application having different editing capabilities than the application;

determining, at the first application, whether the first application will open the electronic content for editing by determining whether the item conforms to one or more requirements;

if it is determined that the first application will open the electronic content, opening the electronic content in the first application; and if it is determined that the first application will not open the electronic content, displaying a notification in the first application.

19. The method of claim 18
wherein the item is associated with arbitrary code received in a text editor application for inclusion in the electronic content; and
wherein determining whether the item conforms to one or more requirements comprises determining whether the arbitrary code conforms to the one or more requirements.

20. The method of claim 18 wherein the second application performed a compatibility check to determine whether the electronic content with the arbitrary code is compatible with the first application, wherein the first application uses the same compatibility check for determining whether to open the electronic content.

21. The method of claim 18 wherein the first application and second application are both parts of a single application.

22. A system comprising:
a processor executing instructions stored in a computer readable medium to provide an application, the application comprising:
a module for receiving electronic content comprising items to be displayed and edited in the application, wherein the application has limited capabilities for editing an item of the items of the electronic content, the item editable in a second application having different editing capabilities than the application; and
a module for displaying the electronic content for editing in a What-You-See-Is-What-You-Get (WYSIWYG) interface of the application, wherein a notification is displayed indicating that editing of the item is restricted in the application.

23. The system of claim 22 wherein the system further comprises an edit approver for receiving an edit associated with the item and determining whether the edit is acceptable based on the analysis of arbitrary code.

24. A non-transitory computer-readable medium on which is encoded program code, the program code comprising:
program code for receiving, at an application executing on a device, electronic content comprising items to be displayed and edited in a What-You-See-Is-What-You-Get (WYSIWYG) interface of the application, wherein the application has limited capabilities for editing an item of the items of the electronic content, wherein the application has limited capabilities for editing the item because the item comprises a feature or attribute that the application is not capable of editing, the feature or attribute editable in a second application having different editing capabilities than the application;
program code for opening the electronic content for editing in the application; and
program code for indicating, in the application, that editing of the item is restricted.

* * * * *